(12) United States Patent
Irissou et al.

(10) Patent No.: US 8,253,400 B2
(45) Date of Patent: Aug. 28, 2012

(54) CURRENT SENSING FOR HIGH VOLTAGE BUCK CONVERTER

(75) Inventors: Pierre Irissou, Sunnyvale, CA (US); Etienne Colmet-Daage, Los Altos, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 465 days.

(21) Appl. No.: 12/536,595

(22) Filed: Aug. 6, 2009

(65) Prior Publication Data
US 2010/0033146 A1 Feb. 11, 2010

Related U.S. Application Data

(60) Provisional application No. 61/086,814, filed on Aug. 7, 2008, provisional application No. 61/086,816, filed on Aug. 7, 2008.

(51) Int. Cl.
*G05F 1/10* (2006.01)
(52) U.S. Cl. ........................................................ 323/282
(58) Field of Classification Search .................. 323/271, 323/282
See application file for complete search history.

(56) References Cited

U.S. PATENT DOCUMENTS

| | | | |
|---|---|---|---|
| 6,414,469 B1 * | 7/2002 | Zhou et al. | 323/272 |
| 7,061,213 B2 * | 6/2006 | Yoshida | 323/224 |
| 7,372,238 B1 * | 5/2008 | Tomiyoshi | 323/224 |
| 7,808,313 B2 * | 10/2010 | Markowski et al. | 330/136 |
| 2004/0056644 A1 | 3/2004 | Wang | |
| 2005/0140347 A1 | 6/2005 | Chen et al. | |
| 2005/0225307 A1 | 10/2005 | Sato et al. | |
| 2005/0231183 A1 | 10/2005 | Li et al. | |
| 2007/0195568 A1 | 8/2007 | Sato | |
| 2007/0291520 A1 | 12/2007 | Schuellein | |
| 2008/0106917 A1 * | 5/2008 | Holt | 363/26 |

FOREIGN PATENT DOCUMENTS

| | | |
|---|---|---|
| JP | 10-341572 A | 12/1998 |
| JP | 2008-148473 A | 6/2008 |

OTHER PUBLICATIONS

PCT/US2009/053100, filed Aug. 7, 2009, International Search Report mailed Apr. 7, 2010, 3 pages.

* cited by examiner

*Primary Examiner* — Adolf Berhane
*Assistant Examiner* — Yemane Mehari
(74) *Attorney, Agent, or Firm* — Holland & Hart LLP

(57) ABSTRACT

Methods, systems, and devices are described for providing output (e.g., current) sensing and feedback in high-voltage switching power converter topologies. Certain aspects of high voltage switching converter topologies may make output (e.g., current) sensing difficult. In some embodiments, a sampling module implements sample-and-hold techniques in a low-side switch converter topology to provide reliable current sensing. Embodiments of the sampling module provide certain functionality, including integration, blanking, buffering, and adjustable sampling frequency. Further, some embodiments include feedback functionality for generating a converter driver signal (for driving the switching converter) and/or a sample driver signal (for driving the sampling module) as a function of sensed output feedback from the sampling module.

24 Claims, 10 Drawing Sheets

CURRENT SENSING FOR HIGH VOLTAGE BUCK CONVERTER

CROSS-REFERENCES

This application claims the benefit of and is a non-provisional of U.S. Provisional Application Ser. No. 61/086,814, filed on Aug. 7, 2008, titled "CURRENT SENSING FOR HIGH VOLTAGE BUCK CONVERTER"; and U.S. Provisional Application Ser. No. 61/086,816, filed on Aug. 7, 2008, titled "SWITCHED CONVERTER FOR SWITCHED LOAD," both of which are hereby expressly incorporated by reference in their entirety for all purposes.

BACKGROUND

The present invention relates to power circuits in general and, in particular, to high-voltage power converter circuits.

Many electronics applications use switching power converters to convert a DC bus voltage to an appropriate load voltage. When the DC bus voltages are sufficiently low, it may be possible to implement many functions of the converter with low-voltage components. For example, it may be desirable to regulate the output of the converter to a load by sensing the current flowing to the load. In a low-voltage converter, the low-voltage components may be used to implement current sensing and feedback circuitry (e.g., oscillators, error amplifiers, etc.). These low-voltage components may typically be less expensive and smaller than their high-voltage counterparts, and may be more fully integrated into integrated circuits ("ICs") with less expensive manufacturing processes.

In some applications, however, the DC bus voltage is relatively high. For example, certain applications may include low voltage electronics (e.g., operating at 5 or 12 volts DC), configured to receive power from mains line voltage (e.g., via a wall outlet operating at 110 or 220 volts AC). Often, conversion of the mains AC voltage to the low-voltage DC load output involves multiple stages of conversion: a first stage that converts the high-voltage AC input to a relatively high-voltage DC bus; and a second stage that converts the high DC bus voltage to a low DC output voltage. Because the second (e.g., output) stage is driven by a high-voltage DC bus, certain high-voltage circuit topologies may be used, which may limit the ability to use low-voltage components and manufacturing processes. This may, in turn, make it difficult and/or expensive to implement functionality, such as current sensing, to add to the effectiveness of the switching converter.

FIG. 1A shows a simplified schematic view of a typical "buck" switching converter 100 implemented with a high-side switch topology. As illustrated, the buck converter includes a DC source 110 that generates a positive DC bus voltage rail 102 and a negative DC bus voltage rail 104. For example, the DC source 110 is a first stage converter that converts an AC input voltage to the DC bus voltage (i.e., the difference between the positive DC bus voltage rail 102 and the negative DC bus voltage rail 104). In some embodiments, the negative DC bus voltage rail 104 is tied to ground. The buck converter is configured to step down the DC bus voltage to a lower voltage appropriate for driving a load 150.

The buck converter includes a power switch 130. In some embodiments, the power switch 130 is implemented as a P-channel MOSFET. As shown in FIG. 1A, power switch 130 is configured as a high-side switch tied to the positive DC bus voltage rail 102. A gate driver module 120 generates a switching signal (e.g., a square wave) that drives power switch 130, such that 130 opens and closes as a function of a duty cycle and a switching frequency. The high-side configuration may allow the bus voltage and the load 150 to share a common ground, which may be desirable or even required by certain applications.

In each cycle, when power switch 130 is closed (e.g., power switch 130 is ON), current flows from the positive DC bus voltage rail 102, through an inductor 116, and into the load 150. As current flows through inductor 116, stored energy is built up in inductor 116 (e.g., as a function of the peak current flowing into inductor 116). In each cycle, when power switch 130 is open (e.g., the switch is OFF), the connection between inductor 116 and the positive DC bus voltage rail 102 is interrupted. A diode 114 allows the energy stored in inductor 116 to flow to the load 150, demagnetizing inductor 116. In certain embodiments, inductor 116 fully demagnetizes in each cycle while power switch 130 is open ("discontinuous" operation). In other embodiments, inductor 116 only partially demagnetizes before the next cycle begins, and power switch 130 closes again ("continuous" operation). Further, in particular embodiments, one or more capacitors 112 are provided, for example, to reduce voltage and current ripple to the load 150.

The operation of the converter may also be seen in FIG. 1B, which shows a graph 135 of two cycles of the current through power switch 130, a graph 115 of two cycles of the current through diode 114, and a graph 117 of two cycles of the current through inductor 116. In some embodiments, operation of the switching converter 100 is improved by increasing the ON-time of power switch 130 during each cycle. During each cycle, it can be seen from graph 135 and graph 117 that the current through inductor 116 ramps up while power switch 130 is ON, and the current through inductor 116 ramps down while power switch 130 is OFF (i.e., while current is flowing through diode 114, as shown in graph 115). It is worth noting that the current through inductor 116 never reaches zero (i.e., the graph is showing "continuous" operation), and the range between the minimum and maximum currents may be relatively small in certain applications (e.g., a five- to ten-percent variation).

It will be appreciated that this circuit topology may allow current to flow to the load 150 during both parts of each cycle, both when power switch 130 is open and when power switch 130 is closed. In some applications, this may be desirable when compared to other switching regulator techniques, for example, in relation to ripple, noise ("EMI"), and efficiency performance. Further, the high-side configuration may be implemented with low-voltage components and manufacturing processes, so long as the bus voltage is sufficiently low. For example, silicon processes may be readily available for implementing highly integrated controllers at bus voltages of up to approximately 40 to 60 volts. These integrated controllers may include desirable and/or necessary functions, such as oscillators, voltage references, error amplifiers, current limiters, thermal protection circuits, level shifters, power switches, etc. Some advanced silicon processes may even allow integration of certain demagnetization circuitry by replacing diode 114 with a MOSFET driven synchronously, which may provide more efficient and integrated solutions.

Many applications, however, desire to operate with higher bus voltages. For example, it may be desirable to design certain electronics applications to operate "off-line" (e.g., by converting a mains line voltage to a DC bus voltage). In various geographic regions, this "off line" operation may generate high bus voltages (e.g., in a range of 150 to 600 volts). In many of these high-voltage applications, it may not be possible or desirable to use low-voltage converters (e.g., buck converters) to step down the load voltage. High-voltage step-down converters, however, may not be able to use the same solutions as low-voltage applications to provide efficient and affordable integrated solutions.

Particularly, when using a high-side switch topology in a high-voltage environment, it may be difficult to implement control circuitry using low-voltage components. For example, current sensing may be more difficult in high-voltage converters. With low-voltage designs, current sensing may be performed almost anywhere in the circuit (e.g., wherever the circuit designer deems it appropriate to sense current, including at the low-side, high-side, floating, etc.). With high-voltage designs, however, sensing current at the high-side or at floating locations may involve using complicated and power-hungry circuits, which may jeopardize the practicality and/or the performance of the design. Low-side sensing may, therefore, be desirable to sense current and properly control a high-voltage converter.

It may be desirable to implement low-side sensing using a low-side switch topology in high-voltage environments. Implementing a high-voltage controller in a low-side switch topology may also allow for the use of N-channel MOSFETs, rather than P-channel MOSFETs, for switching, which may be desirable for a number of reasons. One reason is that N-channel MOSFETs may be substantially smaller and less expensive than P-channel MOSFETs. Another reason is that N-channel MOSFETs may be available with voltage ratings in excess of 1,000 volts, while P-channel MOSFETs may typically be available in lower voltage ranges. Yet another reason is that driving a high-voltage P-channel MOSFET may require a level shifter, which may increase the complexity and power demands of the circuit.

FIGS. 2A and 2B show two simplified schematic views of high-voltage buck converters 200 implemented with low-side switch topologies. Both circuits show a high-voltage source (at terminals 206 and 208) generating a high-voltage DC bus (between terminals 202 and 204). For example, the DC bus may be generated by a DC source 210. Each high-voltage buck converter 200 includes a power switch 230. In some embodiments, the power switch is implemented as an N-channel MOSFET. As shown, power switch 230 is configured as a low-side switch tied to the negative DC bus voltage rail 202. A gate driver module 220 generates a switching signal (e.g., a square wave) that drives power switch 230, such that power switch 230 opens and closes as a function of a duty cycle and a switching frequency.

Operation of the high-voltage buck controllers 200 may be similar to that of the low-voltage buck controllers 100 described with reference to FIGS. 1A and 1B. In each cycle, when power switch 230 is closed (e.g., the switch is ON), current flows from the positive DC bus voltage rail 202, through an inductor 216, and a load 250, connected in series. As current flows through inductor 216, stored energy is built up in inductor 216. In each cycle, when power switch 230 is open (e.g., the switch is OFF), the connection between inductor 216 and the negative DC bus voltage rail 204 is interrupted. A diode 214 allows the energy stored in inductor 216 to flow to the load 250, demagnetizing inductor 216. Various embodiments may operate in "continuous" or "discontinuous" modes, as described above. Further, in particular embodiments, one or more capacitors 212 are provided, for example, to reduce voltage and current ripple to the load 250.

It is worth noting that the embodiments of FIGS. 2A and 2B may exhibit different electrical characteristics. According to the embodiment of FIG. 2B, current may flow directly from the positive DC bus voltage rail 202 into the load 250. However, according to the embodiment of FIG. 2A, current flowing from the positive DC bus voltage rail 202 into the load 250 must first pass through inductor 216. Depending on a number of factors, the "floating" load 250 topology of FIG. 2A may be more or less desirable for certain applications (e.g., due to differences in parasitic capacitance, etc.).

The operation of the high-voltage buck converters 200 may also be seen in FIG. 2C, which shows a graph 235 of two cycles of the currents through power switch 230 and a graph 217 of two cycles of the currents through inductor 216. During each cycle, it can be seen that the current through inductor 216 ramps up while power switch 230 is closed, and the current through inductor 216 ramps down while power switch 230 is open. It is worth noting that the current through inductor 216 never reaches zero (i.e., the graph is showing "continuous" operation), and the range between the minimum and maximum currents may be relatively small in certain applications (e.g., five- to ten-percent variation).

As described above, it may be desirable in certain applications to sense the current flowing through the load 250. For example, by feeding the sensed current back into the converter 200, it may be possible to regulate the current in the load 250 (e.g., maintain a desired load current). However, it may also be desirable to sense the current in a high-voltage converter at the low-side to allow implementations using low-voltage components. One difficulty with low-side current sensing may be that, as shown in graph 235, each cycle of current flowing through power switch 230 may begin with a large spike (i.e., from $I_{L1}=0$ to $I_{L1}=I_{PK}$). This spike may be related to charge or discharge through power switch 230 of parasitic capacitances, for example from power switch 230, inductor 216, and/or a circuit board. In some embodiments, characteristics of the current spike are further affected by the DC bus voltage level (e.g., between rail 202 and rail 204), switching frequency, and/or other characteristics. As such, while low-voltage converters may operate in the context of relatively clean and easy-to-process waveforms, high-voltage applications may operate in the context of parasitic effects and large spikes.

As such, it may be desirable to provide methods, systems, and devices for implementing enhanced functionality in the context of high-voltage switching power converters.

SUMMARY

Among other things, methods, systems, and devices are described for providing current sensing and feedback in high-voltage switching power converter topologies. Certain aspects of high voltage switching converter topologies may make output (e.g., current) sensing difficult. In some embodiments, a sampling module implements sample-and-hold techniques in a low-side switch converter topology to provide reliable current sensing. Embodiments of the sampling module provide certain functionality, including integration, blanking, buffering, and adjustable sampling frequency. Further, some embodiments include feedback functionality for generating a converter driver signal (for driving the switching converter) and/or a sample driver signal (for driving the sampling module) as a function of sensed output feedback from the sampling module.

In one set of embodiments, a circuit is provided. The circuit includes an output sensing module, configured to be communicatively coupled with a switching power converter, and operable to generate an output sense signal as a function of a load output, wherein: the switching power converter is configured according to a low-side switching topology, includes a low-side switching module, and is operable to receive a converter driver signal having a duty cycle and switch a bus voltage as a function of the converter driver signal to generate the load output as a function of the duty cycle; and the output sense signal has a period, including: a first portion of the period, during which the output sense signal substantially correlates with the load output; and a second portion of the period, during which the output sense signal substantially does not correlate with the load output; and a sampling module, communicatively coupled with the output sensing module, and operable to sample the output sense signal during the first portion of the period to generate an output sense level that is functionally related to the load output.

In another set of embodiments, a method is provided. The method includes generating an output sense signal as a function of a load output, the load output being generated by a switching power converter configured according to a low-side switching topology and including a low-side switching module, the switching power converter being operable to receive a converter driver signal having a duty cycle and switch a bus voltage as a function of the converter driver signal to generate the load output as a function of the duty cycle, wherein the output sense signal has a period, including: a first portion of the period, during which the output sense signal substantially correlates with the load output; and a second portion of the period, during which the output sense signal substantially does not correlate with the load output; sampling the output sense signal only during the first portion of the period to generate an output sense level that is functionally related to the load output.

And in another set of embodiments, a system is provided. The system includes means for generating an output sense signal as a function of a load output, the load output being generated by a switching power converter configured according to a low-side switching topology and including a low-side switching module, the switching power converter being operable to receive a converter driver signal having a duty cycle and switch a bus voltage as a function of the converter driver signal to generate the load output as a function of the duty cycle, wherein the output sense signal has a period, including: a first portion of the period, during which the output sense signal substantially correlates with the load output; and a second portion of the period, during which the output sense signal substantially does not correlate with the load output; and means for sampling the output sense signal only during the first portion of the period to generate an output sense level that is functionally related to the load output.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Systems, devices, and methods are described for providing current sensing and feedback in high-voltage switching power converter topologies.

Embodiments of the invention will be described with reference to "buck converters." As used herein, "buck converters" are intended to include any type of switched step-down converter, particularly those in which the load and inductor are in series. It will be appreciated by those of skill in the art that many embodiments described herein may also be readily implemented with other types of converters, including flyback and center-tap push-pull converters. As such, the described embodiments are intended only as enabling examples of the invention and should not be construed as limiting in any way.

Many electronics applications desire to operate in relatively high bus voltage ranges. For example, it may be desirable to design certain electronics applications to operate "off-line" (e.g., by converting a mains line voltage to a DC bus voltage). In various geographic regions, this "off line" operation may generate high bus voltages (e.g., in a range of 150 to 600 volts). In many of these high-voltage applications, it may not be possible or desirable to use low-voltage converters (e.g., buck converters) to step down the load voltage. High-voltage step-down converters, however, may not be able to use the same solutions as low-voltage applications to provide efficient and affordable integrated solutions.

Implementing a high-voltage controller in a low-side switch topology may also allow for the use of N-channel MOSFETs, rather than P-channel MOSFETs, for switching, which may be desirable for a number of reasons. One reason is that N-channel MOSFETs may be substantially smaller and less expensive than P-channel MOSFETs. Another reason is that N-channel MOSFETs may be available with voltage ratings in excess of 1,000 volts, while P-channel MOSFETs may typically be available in lower voltage ranges. Yet another reason is that driving a high-voltage P-channel MOSFET may require a level shifter, which may increase the complexity and power demands of the circuit.

It will be appreciated that, for at least these reasons, it may be difficult to implement control circuitry using low-voltage components when using a high-side switch topology in a high-voltage environment. For example, current sensing may be more difficult in high-voltage converters. With low-voltage designs, current sensing may be performed almost anywhere in the circuit (e.g., wherever the circuit designer deems it appropriate to sense current, including at the low-side, high-side, floating, etc.). With high-voltage designs, however, sensing current at the high-side or at floating locations may involve using complicated and power-hungry circuits, which may jeopardize the practicality and/or the performance of the design. Low-side sensing may, therefore, be desirable to sense current and properly control a high-voltage converter.

Figure 1A:
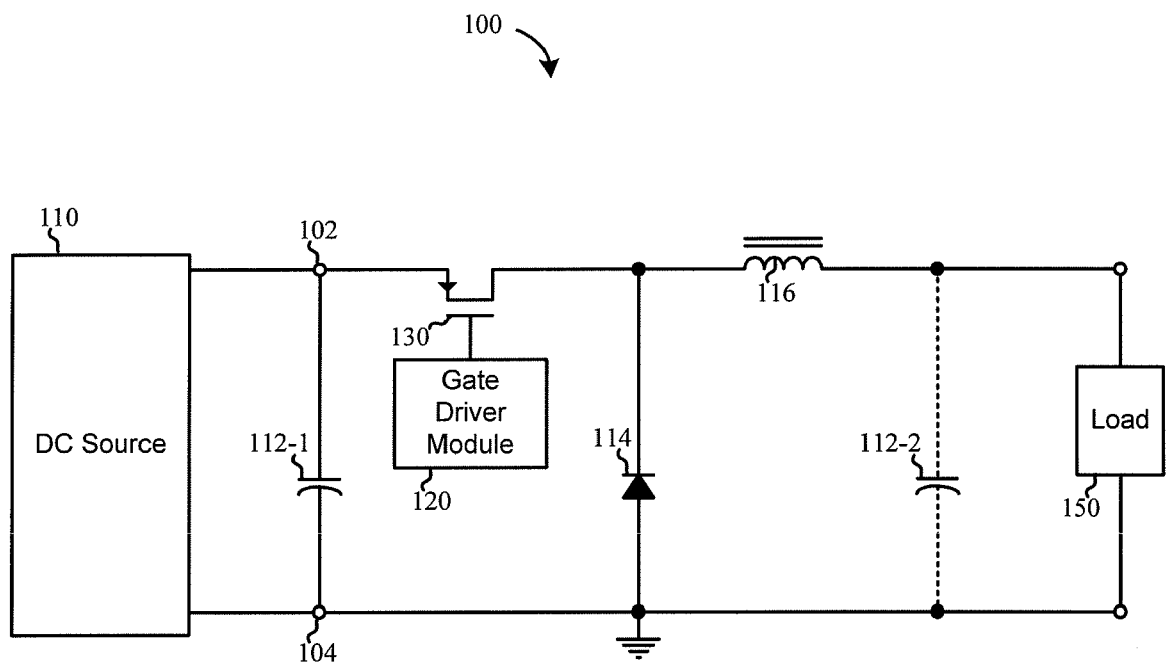
FIG. 1A shows a simplified schematic view of a buck converter implemented with a high-side switch topology.
Figure 1B:
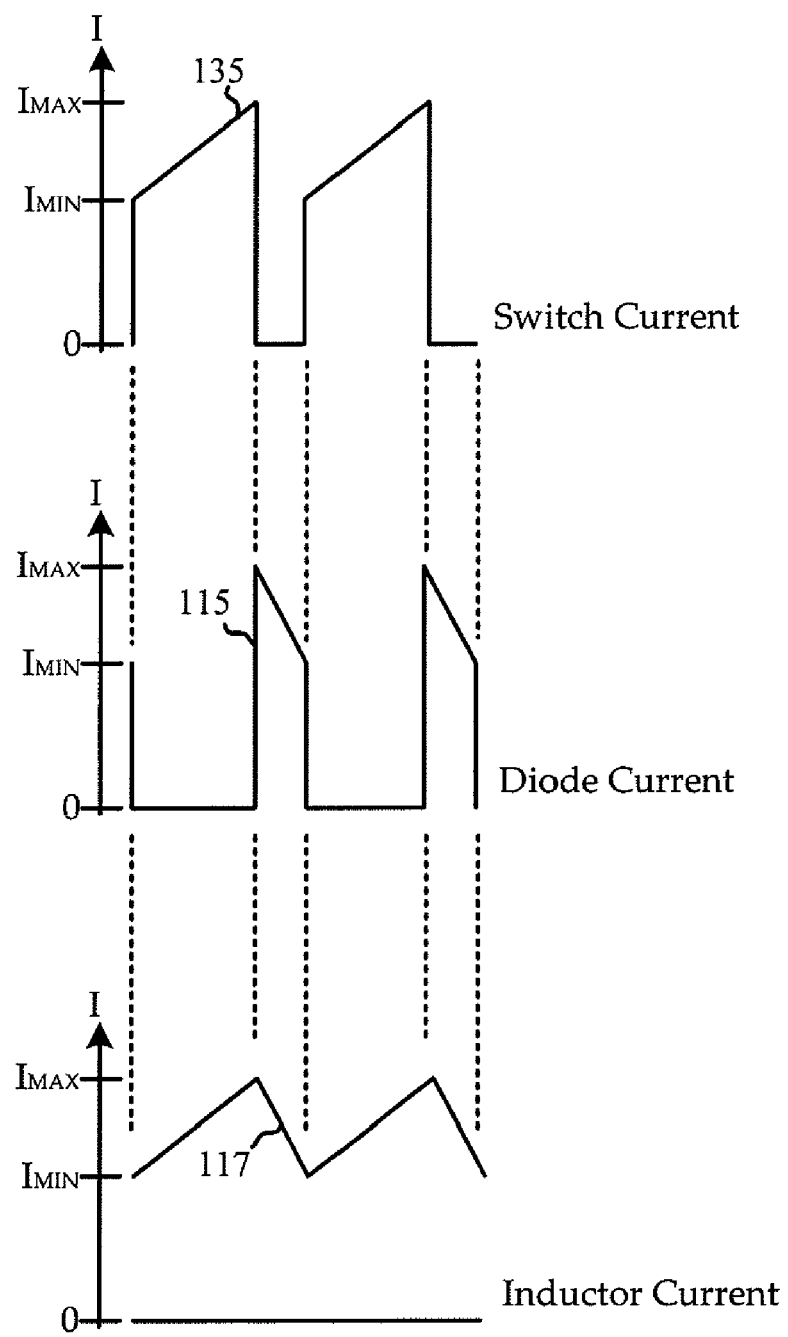
FIG. 1B shows simplified graphs of two cycles of current through various components of the converter shown in FIG. 1A.
Figure 2A:
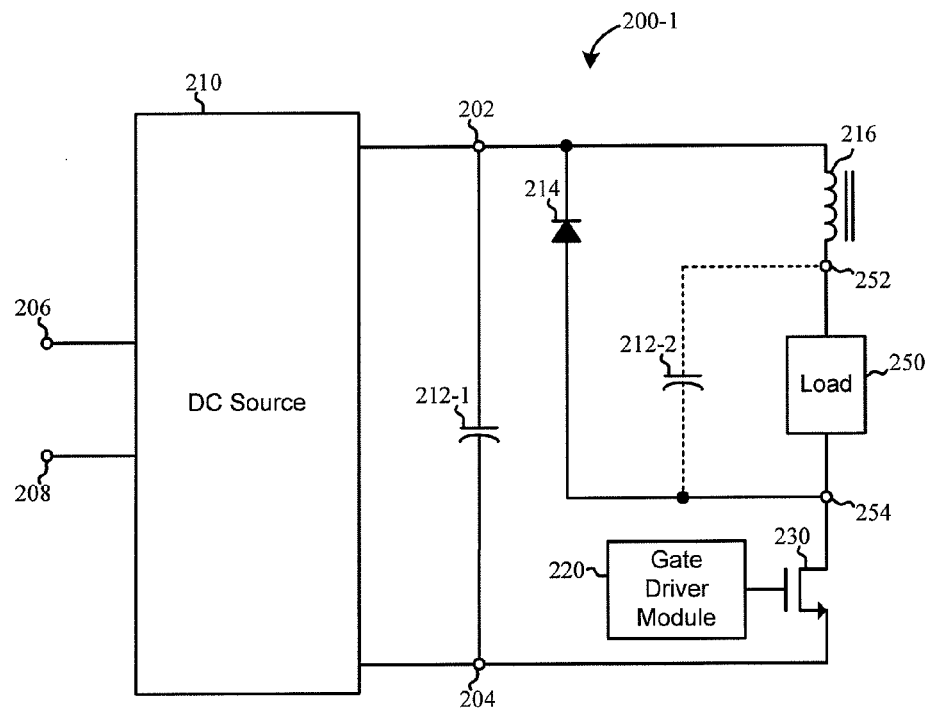
FIGS. 2A and 2B show simplified schematic views of two embodiments of high-voltage buck converters implemented with low-side switch topologies.
Figure 2B:
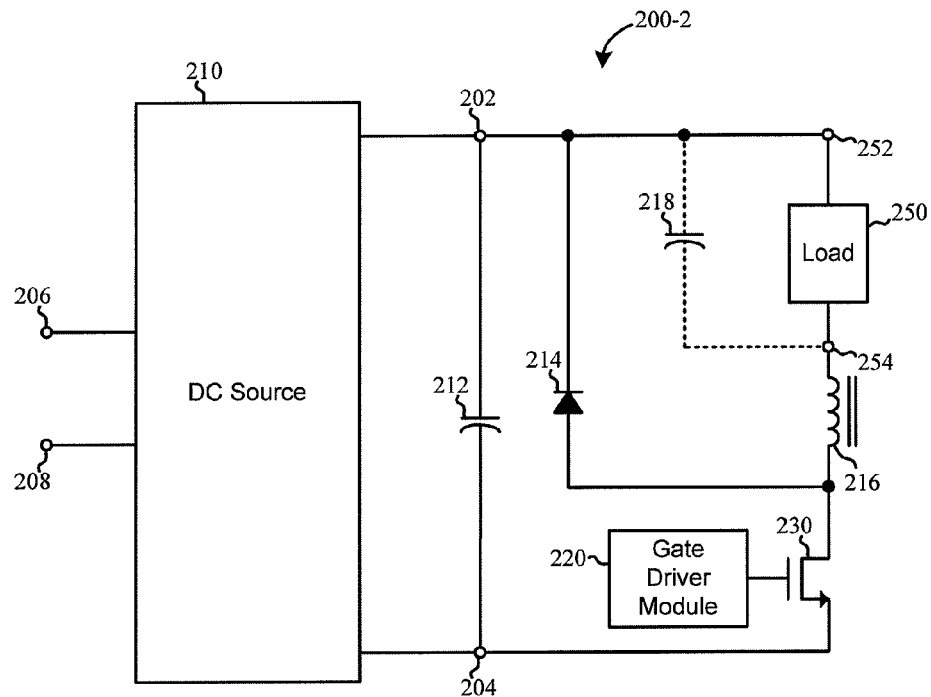
Figure 2C:
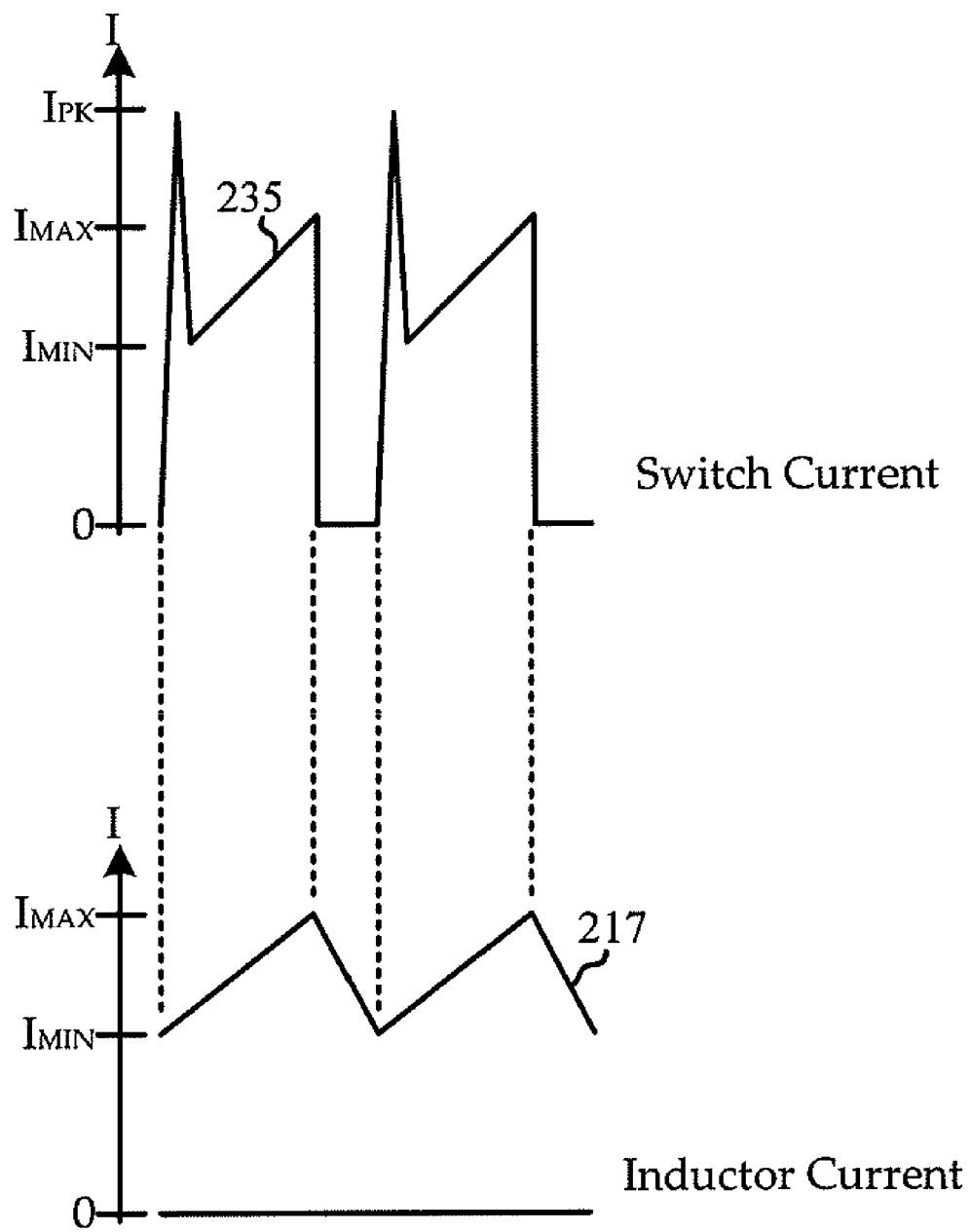
FIG. 2C shows simplified graphs of two cycles of the current through components of the converters of FIGS. 2A and 2B.

Current sensing may provide certain functionality in the context of the power converter. For example, by feeding the sensed current back into the power converter, it may be possible to regulate the current in the load (e.g., maintain a desired load current). However, it may also be desirable to sense the current in a high-voltage converter at the low-side to allow implementations using low-voltage components. One difficulty with low-side current sensing may be that, as shown in FIG. 2C, each cycle of current flowing through power switch 230 may begin with a large spike. This spike may be related to charge or discharge of parasitic capacitances. In some embodiments, characteristics of the current spike are further affected by DC bus voltage level, switching frequency, and/or other characteristics. As such, while low-voltage converters may operate in the context of relatively clean and easy-to-process waveforms, high-voltage applications may operate in the context of parasitic effects and large spikes.

Figure 3:
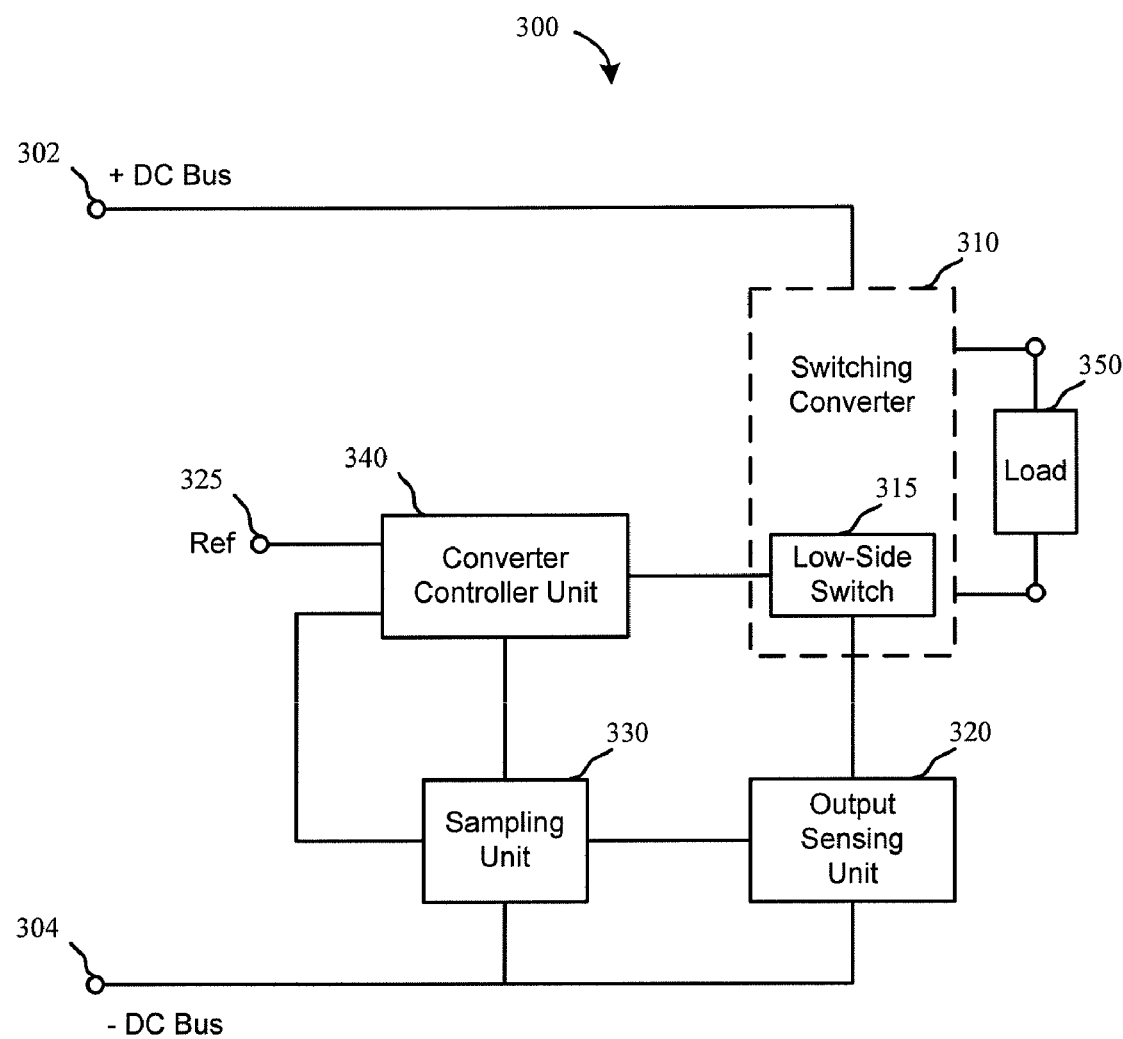
FIG. 3 shows a simplified schematic view of a system for low-side current sensing and feedback in a high-voltage converter, according to various embodiments of the invention.

FIG. 3 shows a simplified schematic view of a system 300 for low-side current sensing and feedback in a high-voltage switching converter 310, according to various embodiments of the invention. Embodiments of the system 300 are configured to effectively sense current in the circuit even in the context of parasitic effects and large spikes inherent in some low-side switch topologies. The system 300 includes a positive DC bus 302 and a negative DC bus 304, which provide power to a switching converter 310. The switching converter 310 uses a topology including a low-side switch 315 to drive a load 350.

Embodiments of the system 300 include an output sensing unit 320. In some embodiments, the output sensing unit 320 is configured to sense output current applied to the load 350. For example, a resistor or other component may be used in series with the low-side switch 315, such that the current through the output sensing unit 320 is related (e.g., proportional) to the current through the low-side switch 315.

As described above with reference to FIGS. 2A and 2B, each cycle of current through the low-side switch 315 may exhibit a large spike at the beginning of the cycle, a period during which the switch current follows the current through the load 350, and a period during which the switch current is substantially zero. When the output sensing unit 320 is configured such that the current sensed by the output sensing unit 320 substantially follows (e.g., is proportional to) the current through the low-side switch 315, the sensed current may only match the output current (e.g., through the load 350) for a portion of each cycle.

In some embodiments, a sampling unit 330 is used to sample the current sensed by the output sensing unit 320 only during the portion of each switching cycle where the switch current relates to the current through the load 350. For example, a blanking circuit may be used to begin sampling only after the spike portion of each cycle. This and other techniques may be used to effectively sample the sensed current without corrupting the result with the non-correlative portions of the switch current waveform (e.g., when there are spikes or zero current values).

Certain embodiments of the sampling unit 330 include other functionality, such as memory (e.g., a hold circuit), integration, buffering (e.g., to protect the hold and/or integration circuitry from discharging), etc. It will be appreciated that using the sampling unit 330 to extract current information may provide for a relatively fast response, as information may be updated at each cycle. Of course, other types of sampling are possible as well, as will be appreciated by those knowledgeable in the art. For example, the current may be sampled at fewer than each cycle or multiple times during a given cycle, if desirable.

In certain embodiments, the system 300 includes a converter controller unit 340. The converter controller unit 340 may be configured to compare the sampled sensed current against a reference level 325. For example, comparing the sampled sensed current against the reference level 325 may allow the converter controller unit 340 to determine how the sampled current relates to a predetermined current level (e.g., where the controller is used to maintain a substantially constant load current). In certain embodiments, the converter controller unit 340 may amplify and/or buffer the sampled current input before comparing it against the reference level 325. In other embodiments, the converter controller unit 340 controls the low-side switch 315. For example, the converter controller unit 340 may include switching controls, gate drivers, etc. for use in driving the switch according to feedback from the output sensing unit 320 and the sampling unit 330. In still other embodiments, the converter controller unit 340 affects certain characteristics of the sampling unit 330. For example, the timing of the sampling unit 330 may be controlled according to the timing of the low-side switch 315, both of which may be controlled by the converter controller unit 340.

Figure 4:
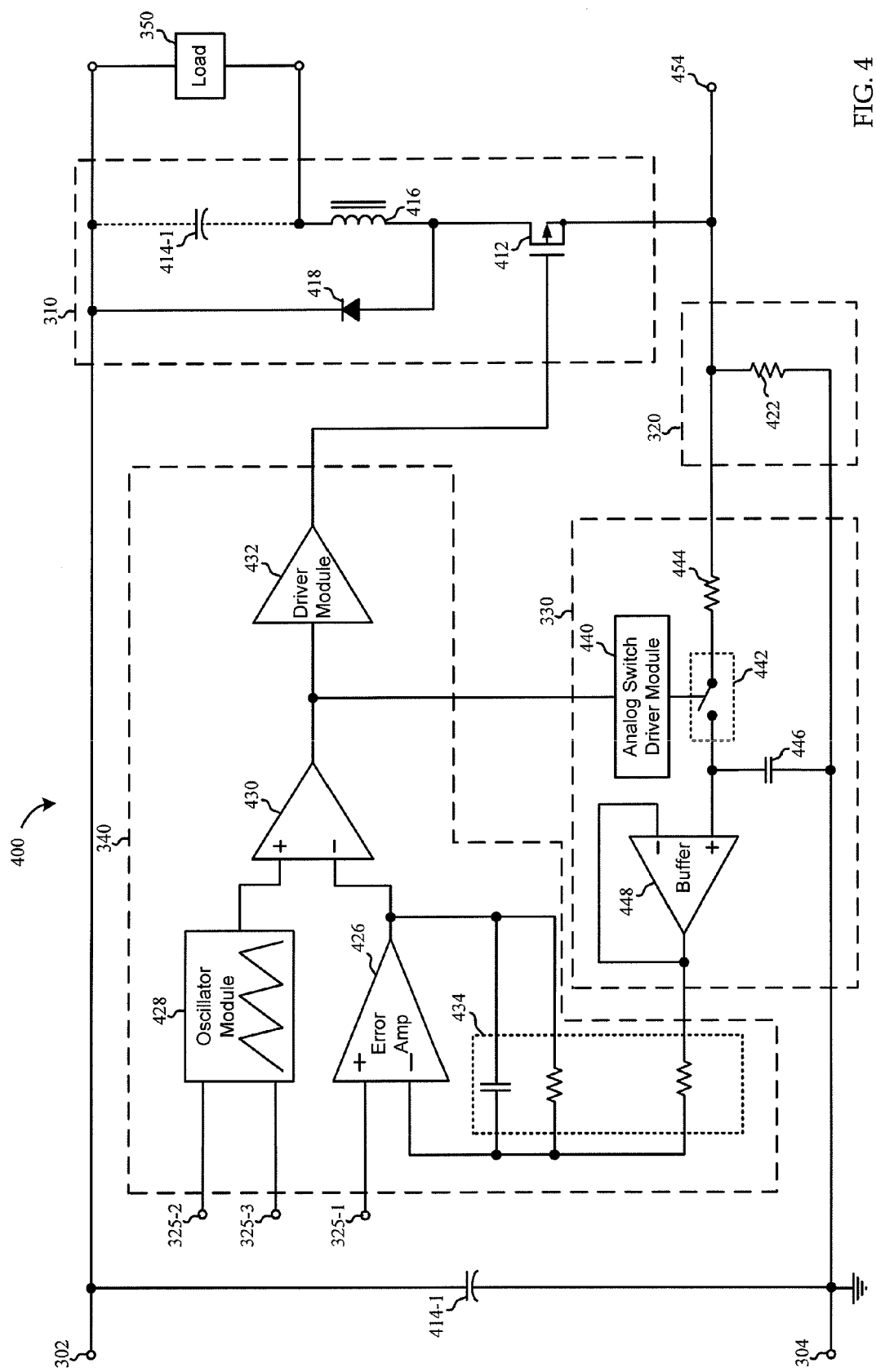
FIG. 4 shows an illustrative schematic diagram of a circuit for implementing the functionality of the system of FIG. 3, according to various embodiments of the invention.

It will be appreciated that many circuit designs and topologies are possible, according to the invention, to implement some or all of the functionality of the system 300 of FIG. 3. FIG. 4 shows an illustrative schematic diagram of a circuit 400 for implementing the functionality of the system 300 of FIG. 3, according to various embodiments of the invention. The circuit 400 includes a converter 310 in a low-side switch topology powered by a DC bus 302, configured to provide power to a load 350.

Embodiments of the circuit 400 include an output sensing unit 320, a sampling unit 330, and a converter controller unit 340, configured for use with the converter 310. In the embodiment shown, converter 310 includes a buck converter topology having low-side switch 412. The source of low-side switch 412 is tied to a load reference terminal 454, and the drain of low-side switch 412 is in series with a network of converter 310 components. The network of converter 310 components includes a diode 418 in parallel with an inductor 416. Inductor 416 is in series with the load 350, across which may be a capacitor 414-1. The network of converter components and the load are tied to the DC bus 302.

The output of the converter 310 to the load 350 is monitored by the output sensing unit 320. Embodiments of the output sensing unit 320 include a resistor 422. Resistor 422 is connected in series with the source of low-side switch 412, such that the current through resistor 422 is proportional to the current through low-side switch 412. As described above, each cycle of current through low-side switch 412 may exhibit a large spike at the beginning of the cycle, a period during which the current through low-side switch 412 follows the current through the load 350, and a period during which the current through low-side switch 412 is substantially zero. As such, the current through resistor 422 may substantially follow (e.g., be proportional to) the current through the load 350 only for a portion of each switching cycle.

It will be appreciated that the current sampled by the output sensing unit 320 may actually be sampled as the voltage seen at terminal 454 (i.e., the voltage across resistor 422). As this voltage is proportional to the current through resistor 422, the voltage at terminal 454 may similarly only be correlative to the output to the load 350 for a portion of each switching cycle. Embodiments of the sampling unit 330 are configured to sample the output sensed by the output sensing unit 320 (e.g., the voltage at terminal 454) only during the portion of each switching cycle where the sampled output correlates with the output to the load 350.

In some embodiments, the sampling unit 330 includes an analog switch 442, driven by an analog switch driver module 440, and a capacitor 446. Capacitor 446 may be connected in parallel with resistor 422, on the other side of analog switch 442. When configured as shown, the voltage across capacitor 446 may substantially track the voltage developed by the current through resistor 422 when analog switch 442 is closed (i.e., when analog switch 442 is closed, resistor 422 and capacitor 446 may both be connected in parallel to terminal 454). When analog switch 442 is opened, capacitor 446 may substantially hold its value. In this way, analog switch 442 and capacitor 446 may create a sample and hold circuit to sample the current through resistor 422 (e.g., or the voltage at terminal 454). For example, if analog switch 442 opens just prior to when low-side switch 412 opens, capacitor 446 may effectively hold (e.g., memorize) a value close to the maximum current through the load (e.g., see $I_M$ in FIG. 2C).

In certain embodiments, analog switch 442 is driven and/or controlled by analog switch driver module 440. The analog switch driver module 440 may be configured to sample the current through resistor 422 only during times when the value may be accurately used to estimate the current through the load 350. For example, the analog switch driver module 440 may drive analog switch 442 to close during each switching cycle, but only during portions of the switching cycle that are relevant to a determination of the current through the load 350. In certain embodiments, the analog switch driver module 440 includes a delay gate (not shown) to generate desired delay for the operation of analog switch 442. In other embodiments, the delay inherent in other circuit elements (e.g., in a gate driver module 432 driving low-side switch 412) may be sufficient to eliminate the need for other delay circuitry in analog switch driver module 440.

In some embodiments, the analog switch driver module 440 may include blanking functionality, such that analog switch 442 only begins sampling after a delay (e.g., after the spike in switch current). In certain embodiments, the blanking delay is preset, while in other embodiments, the blanking delay is adjustable. For example, the blanking delay may be adjustable by providing external selectable components (e.g., pin outs on the IC) or as a function of feedback from other portions of the circuit 400. Embodiments of the analog switch driver module 440 may also drive analog switch 442 to be open (e.g., not be sampling) during the portion of each cycle where the current is substantially zero. This and other techniques may be used to effectively sample the sensed current (e.g., or the voltage at terminal 454) without corrupting the result with the non-correlative portions of the switch current waveform (e.g., when there are spikes or zero current values).

It will be appreciated that other functionality may be included in the sampling unit 330. In some embodiments, an integration circuit is provided to remove any noise and/or effectively average the values being sampled during each sampling period. For example, in the embodiment shown in FIG. 4, an integration resistor 444 is configured to act, along with capacitor 446, as an integration circuit. For example, when analog switch 442 is closed, capacitor 446 is connected with terminal 454 through integration resistor 444.

In other embodiments, the sampling unit 330 includes a buffer 448. Buffer 448 may include any type of buffering component or components known in the art. Further, the gain of buffer 448 may be unity or some other useful value. In some embodiments, capacitor 446 is designed with a small capacitance value to help rapidly and accurately sample and hold the voltage at terminal 454 (e.g., and possibly to increase the number of components that may be integrated onto an IC). To avoid discharging capacitor 446 through other components of the circuit (e.g., through feedback circuitry), it may be desirable to provide buffer 448 with high input impedance.

In some embodiments, the output of the sampling unit 330 is sent to the converter controller unit 340. Embodiments of the converter controller unit 340 are configured to control the converter 310 as a function of the output from the sampling unit 330. For example, current through the load 350 is sensed by the output sensing unit 320, sampled by sampling unit 330, and fed back through the converter controller unit 340 to dynamically adjust the duty cycle of the switching signal driving low-side switch 315.

In some embodiments, the output of the sampling unit 330 is sent to a negative input node of an error amplifier 426. As such, the negative input node of error amplifier 426 (e.g., the level of the output of the sampling unit 330) may be a sampled and/or buffered level relating to the current through the load 350. A positive input node of error amplifier 426 may be connected to a first reference level 325-1, which may be mathematically related to a current desired to be maintained through the load 350. In certain embodiments, the first reference level 325-1 is a voltage that may be fixed or adjustable.

Error amplifier 426 may be used to compare the levels at its inputs to determine an error value between the two. For example, the error value (i.e., the output of error amplifier 426) may effectively represent an error between the sampled load current and the desired load current. As the current level through the load 350 approaches the reference level, the error value may decrease. In certain embodiments, additional loop compensation components 434 (e.g., a parallel feedback network of resistors and capacitors) are provided. The loop compensation components 434 may help shape and/or regulate the frequency response and loop stability of the circuit 400 in one or more operating conditions.

Embodiments of the converter controller unit 340 also include an oscillator module 428, configured to generate a periodic waveform (e.g., a triangle or sawtooth wave) of a particular frequency and amplitude. The characteristics of the periodic waveform may be preset or adjustable. For example, oscillator module 428 may be configured such that the output periodic waveform ranges from a maximum value to a minimum value, determined by a second reference level 325-2 and a third reference level 325-3, respectively. For example, external components may be used to set voltage levels at the reference levels 325.

Outputs from error amplifier 426 and oscillator module 428 may each be connected to input nodes of a comparator 430. In some embodiments, comparator 430 compares the levels at its inputs to generate a converter switching signal for driving low-side switch 412. In other embodiments, the output of comparator 430 is fed to a gate driver module 432, which generates the converter switching signal for driving low-side switch 412.

It will be appreciated that, in this way, the frequency of the converter switching signal may be a function of the frequency of the output of the oscillator module 428, and the duty cycle of the converter switching signal may be a function of the error value output of error amplifier 426. The converter switching signal (e.g., the output of comparator 430 or gate driver module 432) may then be fed back to either or both of the analog switch driver module 440 and low-side switch 412.

It will be appreciated that embodiments of comparator 430 may provide other functionality. For example, it may be desirable to hold output values of comparator 430 for so long as they are valid or to set particular switching thresholds (e.g., to account for noise). As such, embodiments of comparator 430 may provide "set/reset" capability, hysteresis, etc. The oscillator module 428, comparator 430, and/or other components (e.g., gate driver module 432) may be integrated into converter controller unit 340.

In one embodiment, the output of error amplifier 426 is connected to a positive input node of comparator 430 and the output of the oscillator module 428 is connected to a negative input of comparator 430. As the current through the load 350 decreases, the error (e.g., the difference between the sampled current and the reference level at node 325-1, as reflected by the output of the error amplifier 426) may increase. This increased error value, when compared to the output of oscillator module 428 by comparator 430, may cause the duty cycle of the converter switching signal to increase. The increased duty cycle may effectively increase the load current output of converter 310. The increased current through the load 350 may then cause the error to decrease, causing the duty cycle of the converter switching signal to decrease. In this way, the feedback control loop provided by the converter controller unit 340 may allow the current through the load 350 to be maintained to approximately a desired level, set at least in part by node 325-1.

It will be appreciated that, by controlling both analog switch driver module 440 and low-side switch 412 as a function of the same switching control signal, operation of the sampling unit 330 may be effectively synchronized with operation of low-side switch 412. In some embodiments, however, it may be desirable to synchronize analog switch driver module 440 and/or low-side switch 412 with a different signal or component. In one embodiment, circuitry is provided to pulse on the sampling unit 330 (e.g., analog switch 442) at the half-way point of each oscillator cycle (e.g., by using a pair of comparators in communication with oscillator module 428). For example, the sampling unit 330 may then be configured such that it is only sampling from the 25% point to the 50% point of each switching cycle. It is worth noting that, because this and/or other techniques may be used to generate the sample blanking as a function of the oscillator frequency (as opposed to using a preset value set according to an assumed oscillator frequency), it may be possible to operate the circuit in the context of multiple oscillator frequencies or using an adjustable oscillator module 428.

Figure 5:
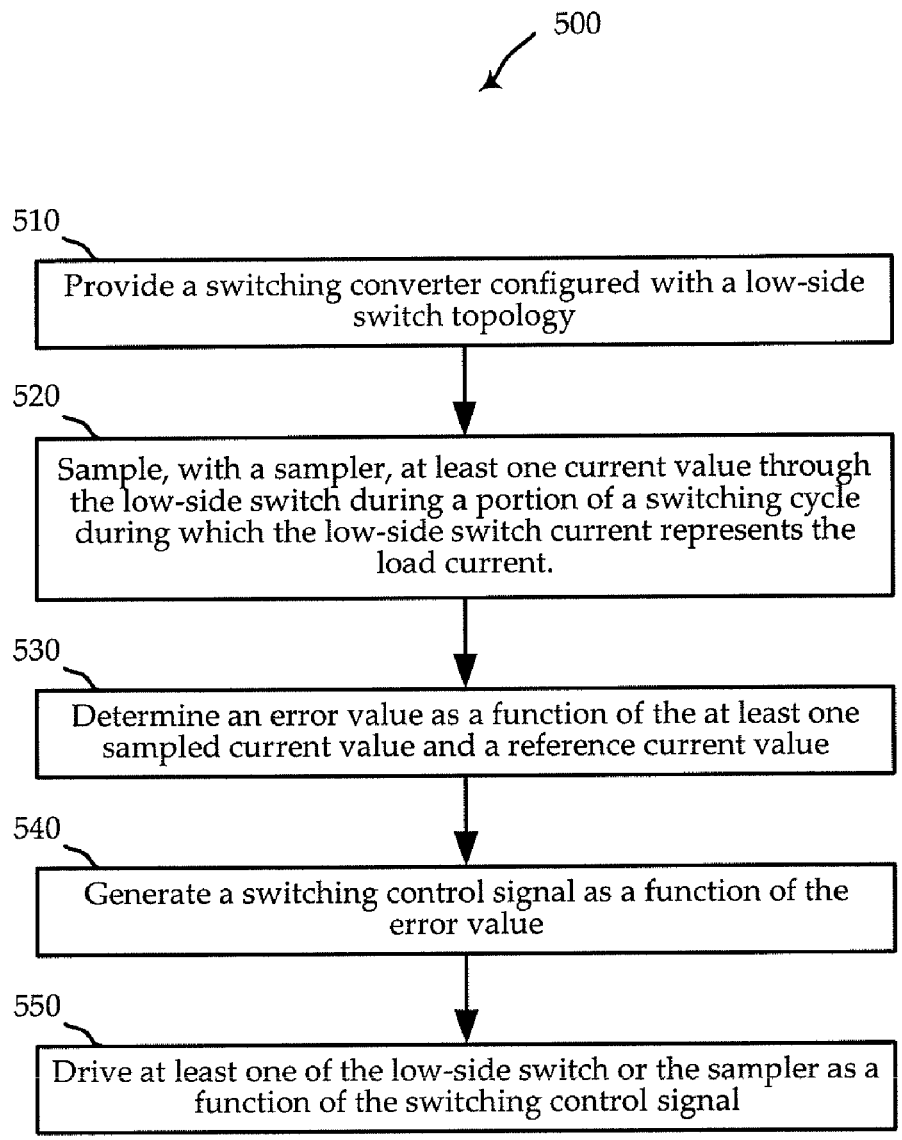
FIG. 5 shows a flow diagram of illustrative methods for low-side current sensing and feedback in a high-voltage converter, according to various embodiments of the invention.

FIG. 5 shows a flow diagram of illustrative methods for low-side current sensing and feedback in a high-voltage converter, according to various embodiments of the invention. The method 500 begins at block 510 by providing a switching converter configured with a low-side switch topology. In some embodiments, the switching converter includes an inductor in series with a load (e.g., a buck converter). In block 520, a sampler may be used to sample at least one current value through the low-side switch during a portion of a switching cycle during which the low-side switch current represents the load current.

In some embodiments, the method 500 may feed back the sampled current, for example, to regulate the switching converter. In block 530, the sampled current may be compared against a reference current value to determine an error value. A switching control signal may then be generated as a function of the error value in block 540. The switching control signal generated in block 540 may be used in block 550 to drive (e.g., control, affect the operation of, etc.) either or both of the low-side switch or the sampler.

Embodiments for Use with Switched Loads

As described above, many electronics applications use switching power converters to convert a DC bus voltage to an appropriate load voltage. In some of these applications, the power converter may receive feedback from the circuit to help regulate the output of the converter to the load. For example, as described with reference to FIGS. 3-5, output current may be sensed and fed back to the converter (e.g., by affecting the duty cycle of the switching signal) to attempt to maintain a desired load current. The output sensing and/or feedback may be performed at a particular sampling frequency, which may be functionally related (e.g., synchronized with, a sub-harmonic of, etc.) the switching frequency of the power converter.

In certain applications, it is desirable to further control output to the load with a load switching signal that may have a frequency far below that of the sampling frequency (e.g., and/or the switching frequency of the power switch in the converter). For example, some light emitting diode ("LED") applications control the brightness of an LED with a pulse-width modulated ("PWM") waveform. The PWM waveform may rapidly toggle the LED (e.g., and effectively the power converter) on and off to generate a lower average output brightness than if the LED remained constantly on.

Where the load control (e.g., PWM) frequency is substantially lower than the sampling frequency for output sensing, undesirable load conditions may be created. For example, each time the load control waveform cycles the switching power converter back on, a transient current overshoot condition may be created. This current overshoot condition may cause the load to be overdriven at each load control cycle, and may cause undesirable output, or even damage, to the load.

Figure 6:
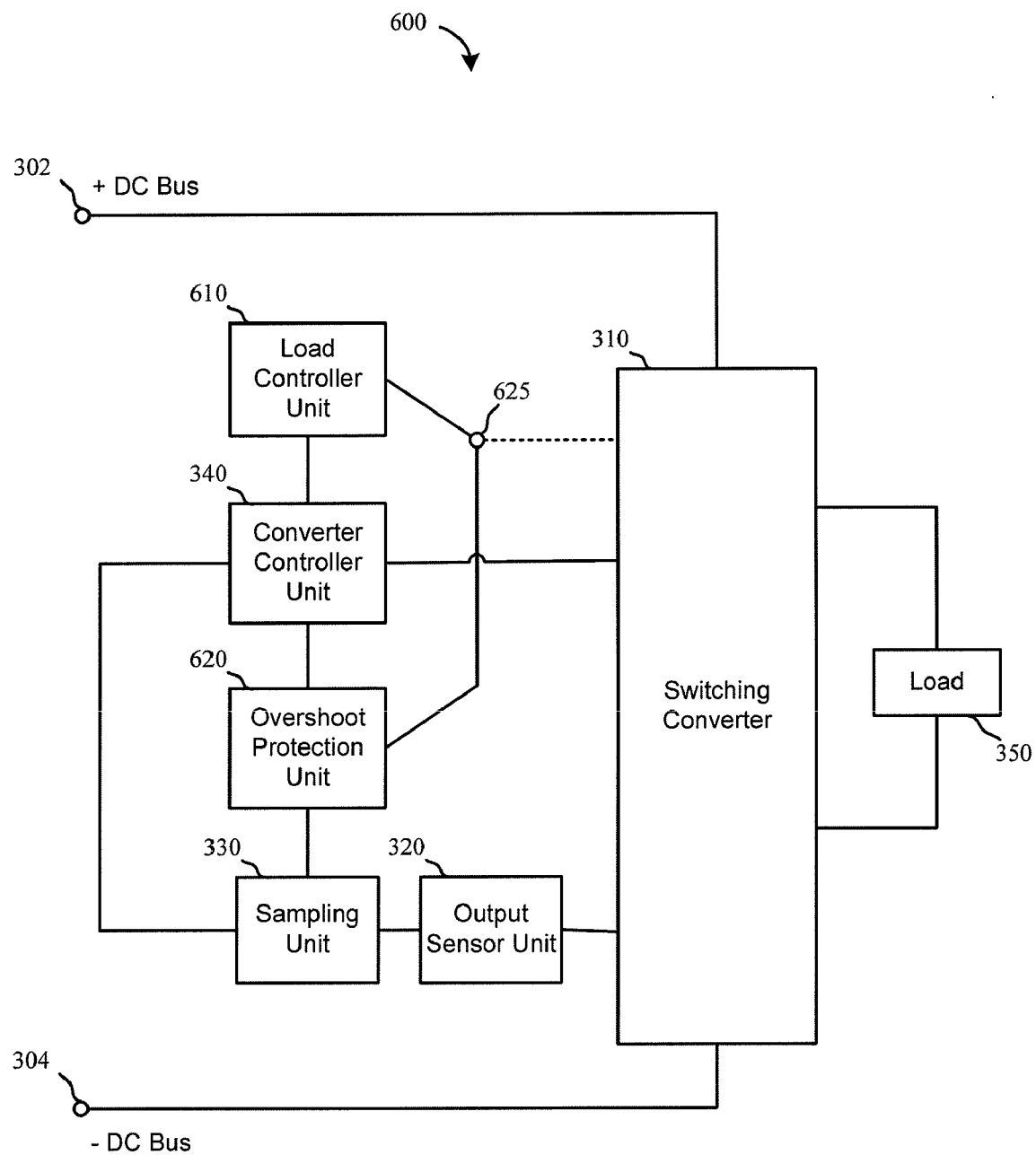
FIG. 6 shows a simplified block diagram of a power system for use with a switching converter and a switched load, according to various embodiments of the invention.

FIG. 6 shows a simplified block diagram of a power system 600 for use with a switching converter and a switched load, according to various embodiments of the invention. The system 600 includes a switching converter 310 configured to drive a load 350. The converter 310 may be any type of power converter that uses switching to generate a load voltage, including, for example, a buck converter, boost converter, flyback converter, hard-switching converter, soft-switching converter, etc. In some embodiments, the switching converter 310 is configured to convert a DC bus voltage (e.g., the voltage between a positive DC bus voltage rail 302 and a negative DC bus voltage rail 304) to power the load 350 in a desirable way. Embodiments of the switching converter 310 are implemented as the converter described with reference to FIGS. 3 and 4.

Embodiments of the switching converter 310 include a feedback path configured to regulate current, voltage, and/or power output to the load 350. The feedback path may include an output sensor unit 320 that senses output from the converter 310 to the load 350 (e.g., the load voltage, load current, load power, etc.). The output may be sensed by the output sensor unit 320 either directly or indirectly. For example, load voltage may be sensed by directly measuring the voltage across the load or indirectly by measuring the voltage across a component in parallel with the load.

In some embodiments, readings of the output sensor unit 320 are sampled by a sampling unit 330. The sampling unit 330 may be used, for example, to more accurately record desired outputs by ignoring certain transient conditions sensed by the output sensor unit 320. In certain embodiments, the sampling unit 330 operates at a sampling frequency. The sampling frequency may be the same as or different from the switching frequency of the switching converter 310. Embodiments of sampling units 330 are described more fully above with reference to FIGS. 3-5.

Certain embodiments of the sampling unit 330 include other functionality, such as memory (e.g., a hold circuit), integration, buffering (e.g., to protect the hold and/or integration circuitry from discharging), etc. It will be appreciated that using the sampling unit 330 to record current information may provide for a relatively fast response, as information may be updated at each cycle. Of course, other types of sampling are possible as well, as will be appreciated by those knowledgeable in the art. For example, the current may be sampled at fewer than each cycle or multiple times during a given cycle, if desirable.

In some embodiments, the output of the sampling unit 330 is passed to a converter controller unit 340. In certain embodiments, the converter controller unit 340 compares the output of the sampling unit 330 to a reference level. For example, the reference level may represent a preset desired load current, and the comparison of the reference against the output of the sampling unit 330 may represent an error level between the desired current output and the actual present output of the switching converter 310. As such, the converter controller unit 340 may be used to determine whether parameters of the switching converter 310 (e.g., the duty cycle of the switching signal) should be adjusted to better supply the desired load output. It will be appreciated that certain embodiments of the converter controller unit 340 may amplify and/or buffer the output of the sampling unit 330, or include other functionality.

In some embodiments, the converter controller unit 340 affects operation of the sampling unit 330. In one embodiment, the converter controller unit 340 supplies the sampling unit 330 with a periodic signal at a predetermined or adjustable sampling frequency for driving the sampling unit 330. For example, the converter controller unit 340 may include a preset or adjustable oscillator configured to generate one or more periodic waveforms at particular frequencies. The same or different waveforms may then be used by the converter controller unit 340 to drive the switching converter 310 and the sampling unit 330.

In some applications, it may be desirable for the load 350 to be a switched load. In these applications, embodiments of the system 600 may include a load controller unit 610 configured to generate a load switching signal 625 for switching the load 350. For example, some LED applications control brightness with a PWM waveform as the load switching signal 625. The PWM waveform may rapidly toggle the LED on and off to generate a lower average output brightness than if the LED remained constantly on.

In certain embodiments, the load 350 is switched by switching the switching converter 310 that is powering the load 350. In these embodiments, the load controller unit 610 may be separate from (e.g., not integrated with) the system 600. For example, the load controller unit 610 may include a phase-cut dimmer circuit, a PWM signal generator, a microcontroller, or any other device or system for generating load switching signal 625.

Typically, the load switching signal 625 frequency may be substantially lower than the converter switching frequency. For example, in lighting applications, the load switching signal 625 frequency may be orders of magnitude lower than the converter switching frequency (e.g., a 1 kHz PWM signal driving a 1 MHz switching converter). In some cases, this may create undesirable load conditions. For example, each time the load switching signal 625 cycles the switching power converter back on, a transient current overshoot or undershoot condition may be created. This current overshoot condition may cause the load to be overdriven at each load control cycle, and may cause undesirable output, or even damage, to the load. For example, laser diodes and/or other components may be sensitive to and may be damaged under overshoot and undershoot conditions.

For example, in one embodiment, the converter controller unit 340 includes an error amplifier configured to compare output of the sampling unit 330 against a preset reference current level, and the converter 310 is driven by both a relatively high frequency converter switching signal (e.g., generated by the converter controller unit 340) and a relatively low frequency load switching signal 625 (e.g., generated by the load controller unit 610). When the load switching signal 625 is low, the switching converter 310 may effectively turn off (e.g., the converter switching signal stays low and does not switch). While the switching converter 310 is effectively off, the current sampled by the sampling unit 330 may be substantially zero (e.g., indicating no current is flowing through the load 350). With the sampled current level at or near zero, the error amplifier in the converter controller unit 340 may detect a large (e.g., maximum) error level between the desired reference current level and the sampled current level. When the load switching signal 625 goes back high (e.g., the converter 310 turns back on), the converter controller unit 340 may initially see a maximum error condition coming from the error amplifier. This may cause the converter controller unit 340 to drive the converter 310 with a substantially 100-percent duty cycle, which may in turn overdrive the load 350 until the feedback path is able to regulate the load current back to a desired level.

To protect against this current overshoot condition, embodiments of the system 600 include an overshoot protection unit 620. In some embodiments, the overshoot protection unit 620 is configured to control operation of the sampling unit 330 such that the sampling unit 330 does not record samples when the load switching signal 625 is low (e.g., when the converter 310 is effectively off). In this way, the system 600 may maintain a nominal load current value for feedback purposes, while effectively ignoring the switching of the load.

In certain embodiments, the overshoot protection unit 620 causes the sampling unit 330 to hold the last sample recorded prior to the load switching signal 625 turning off, such that the last-recorded sample may be seen by the converter controller unit 340 just prior to the load switching signal 625 turning back on. In one embodiment, the system 600 includes memory for storing the samples recorded by the sampling unit 330. The memory is configured to communicate the samples to the converter controller unit 340. The overshoot protection unit 620 may be configured to store the last sample before the load switching signal 625 turned off, and to make that value available to the converter controller unit 340 just prior to the load switching signal 625 turning back on.

Of course, in different converter circuit topology contexts, it may be desirable to use different implementations of the overshoot protection unit 620. In some embodiments, the overshoot protection unit 620 is configured to hold the last value of the converter controller unit 340 just prior to the load switching signal 625 turning off. This embodiment may be desirable, for example, where the sampling unit 330 is not needed to monitor load current. For example, current may feed directly into the converter controller unit 340 (e.g., where a low-voltage switching converter is used). The overshoot protection unit 620 may then hold values of the error signal generated by the converter controller unit 340. In one embodiment, the overshoot protection unit 620 includes sample and hold circuitry for sampling the error output of the converter controller unit 340. In another embodiment, the overshoot protection unit 620 includes a switch (e.g., an analog switch) integrated into the converter controller unit 340 and configured to hold an output value of the converter controller unit 340 when in a particular state (e.g., when open).

Figure 7:
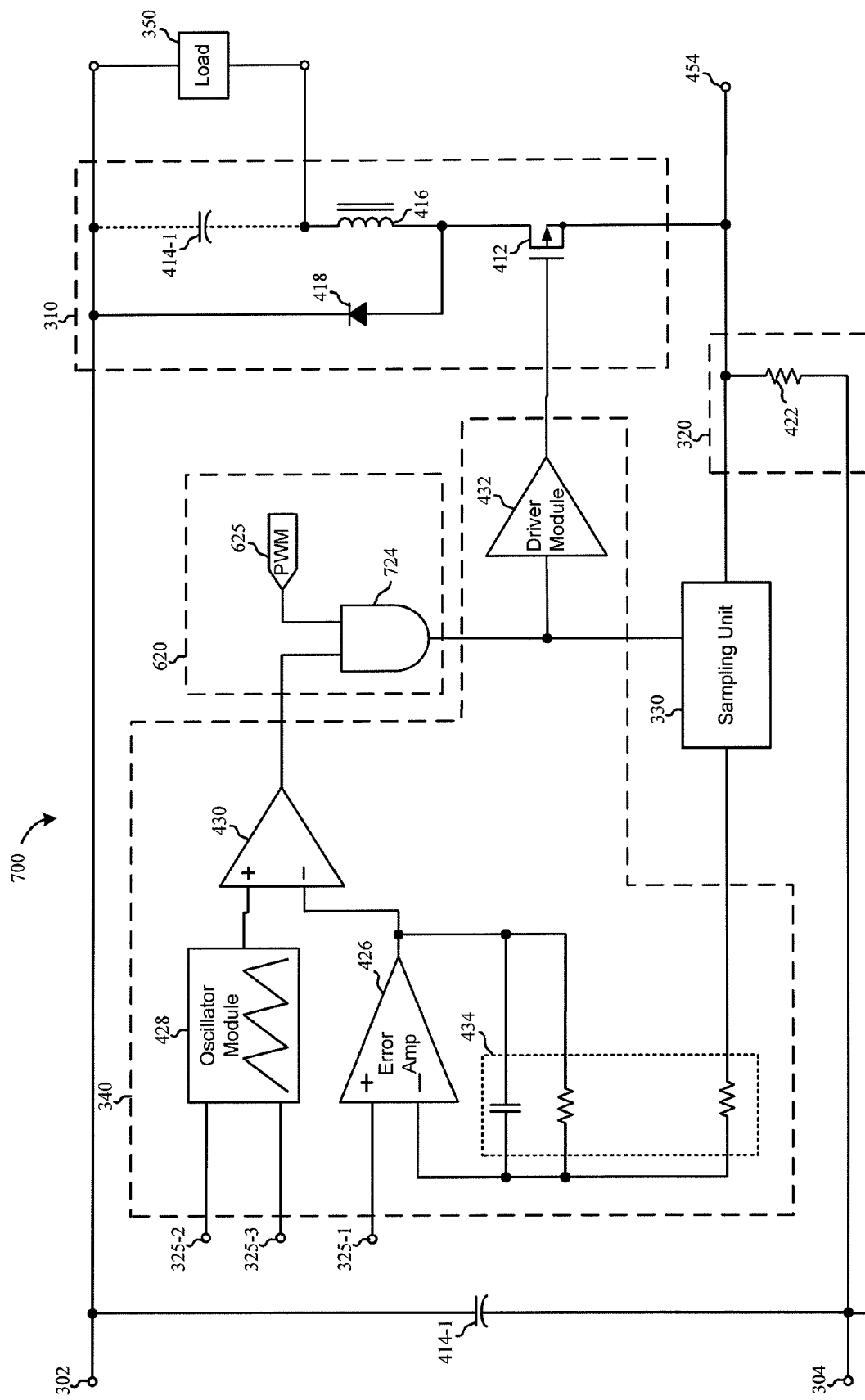
FIG. 7 shows an illustrative schematic diagram of a circuit for implementing the functionality of the system of FIG. 6, according to various embodiments of the invention.

It will be appreciated that many circuit designs and topologies are possible, according to the invention, to implement some or all of the functionality of the system 600 of FIG. 6. FIG. 7 shows an illustrative schematic diagram of a circuit 700 for implementing the functionality of the system 600 of FIG. 6, according to various embodiments of the invention. The circuit 700 includes a converter 310 in a low-side switch topology powered by a DC bus 302, configured to provide power to a load 350.

Embodiments of the circuit 700 include an output sensing unit 320, a sampling unit 330, a converter controller unit 340, and an overshoot protection unit 620, configured for use with the converter 310. In the embodiment shown, converter 310 includes a buck converter topology having low-side switch 412. Embodiments of portions of the circuit 700 are implemented substantially as described with regard to respective portions of the circuit 400 of FIG. 4.

The source of low-side switch 412 is tied to a load reference terminal 454, and the drain of low-side switch 412 is in series with a network of converter 310 components (e.g., diode 418, inductor 416, and capacitor 414-1), configured to provide output to the load 350. The output of the converter 310 to the load 350 is monitored by the output sensing unit 320, which may include a resistor 422. As shown, the output sensor unit 320 may be configured to develop a voltage at terminal 454 that is proportional to the current through the load 350, such that load output can be monitored indirectly by monitoring terminal 454.

As described above, the voltage at terminal 454 may only be correlative to the output to the load 350 for a portion of each switching cycle. As such, embodiments of the sampling unit 330 are configured to sample the output sensed by the output sensing unit 320 (e.g., the voltage at terminal 454) only during the portion of each switching cycle where the sampled output correlates with the output to the load 350. In some embodiments, the sampling unit 330 includes additional functionality, like blanking, integrating, buffering, etc.

Notably, embodiments of the sampling unit 330 sample at a particular frequency. In some embodiments, the sampling frequency is tied to the switching frequency of the converter 310. For example, the sampling frequency may be equal to, or some multiple of, the converter 310 switching frequency.

In some embodiments, the output of the sampling unit 330 is sent to the converter controller unit 340. Embodiments of the converter controller unit 340 are configured to control the converter 310 as a function of the output from the sampling unit 330. For example, current through the load 350 is sensed by the output sensing unit 320, sampled by sampling unit 330, and fed back through the converter controller unit 340 to dynamically adjust the duty cycle of the switching signal driving low-side switch 412. For example, as shown, the duty cycle of the switching signal driving low-side switch 412 may be determined as a function of the output of an error amplifier 426, configured to compare the output of the sampling unit 330 to a first reference level 325-1. Some embodiments of error amplifier 426 are configured with additional loop compensation components 434 (e.g., a parallel feedback network of resistors and capacitors).

Embodiments of the converter controller unit 340 also include an oscillator module 428, configured to generate a periodic waveform (e.g., a triangle or sawtooth wave) of a particular frequency and amplitude. The oscillator module 428 may be configured such that the output periodic waveform ranges from a maximum value to a minimum value, determined by a second reference level 325-2 and a third reference level 325-3, respectively. Outputs from error amplifier error amplifier 426 and oscillator module 428 may each be connected to input nodes of a comparator 430. In some embodiments, comparator 430 compares the levels at its inputs to generate a converter switching signal for driving low-side switch 412. In other embodiments, the output of comparator 430 is fed to a gate driver module 432, which generates the converter switching signal for driving low-side switch 412.

In some embodiments, the output of comparator 430 is sent to the overshoot protection unit 620. In one embodiment, the overshoot protection unit 620 includes an AND logic gate 724 (e.g., or components configured to effectively generate output characteristics like those of an AND logic gate). The output of comparator 430 is applied to one input of AND logic gate 724 and a load switching signal 625 (e.g., generated by a load controller unit (not shown)) is applied to the other input of AND logic gate 724. It will be appreciated that the output of AND logic gate 724 will be HIGH only when both inputs are HIGH. As such, when load switching signal 625 is LOW, the output of AND logic gate 724 will be LOW, regardless of the state of the output of comparator 430.

Rather than using the output of comparator 430 to generate the converter 310 switching signal, embodiments use the output of AND logic gate 724. In this configuration, when load switching signal 625 is LOW, the duty cycle of the converter 310 switching signal is substantially at zero percent. This may effectively turn the converter 310 off (e.g., as low-side switch 412 will remain OFF), and no current will be delivered to the load 350.

As discussed above, if the sampling unit 330 keeps sampling the load output, the error output from the error amplifier in the converter controller unit 340 may jump to some maximum level. When the load switching signal 625 returns to a high state, and the converter 310 turns back on, the duty cycle may initially be set as a function of the maximum error condition (e.g., at or near 100-percent duty cycle). This may cause undesirable (e.g., overshoot) conditions for the load 350.

Embodiments provide the output of overshoot protection unit 620 to the sampling unit 330, as shown. In some embodiments, when the output of overshoot protection unit 620 is LOW, the sampling unit 330 may be configured to not sample. For example, the sampling unit 330 may continue to hold the last valid value of the load output prior to the load switching signal 625 going LOW. This may, in turn, hold the last error value prior to load switching signal 625 going LOW. As such, when load switching signal 625 returns HIGH, the error output will be at a level substantially equal to its level just prior to when load switching signal 625 last went LOW, which may avoid overdriving the load 350 and protect the load 350 from an undesirable overshoot condition.

Figure 8:
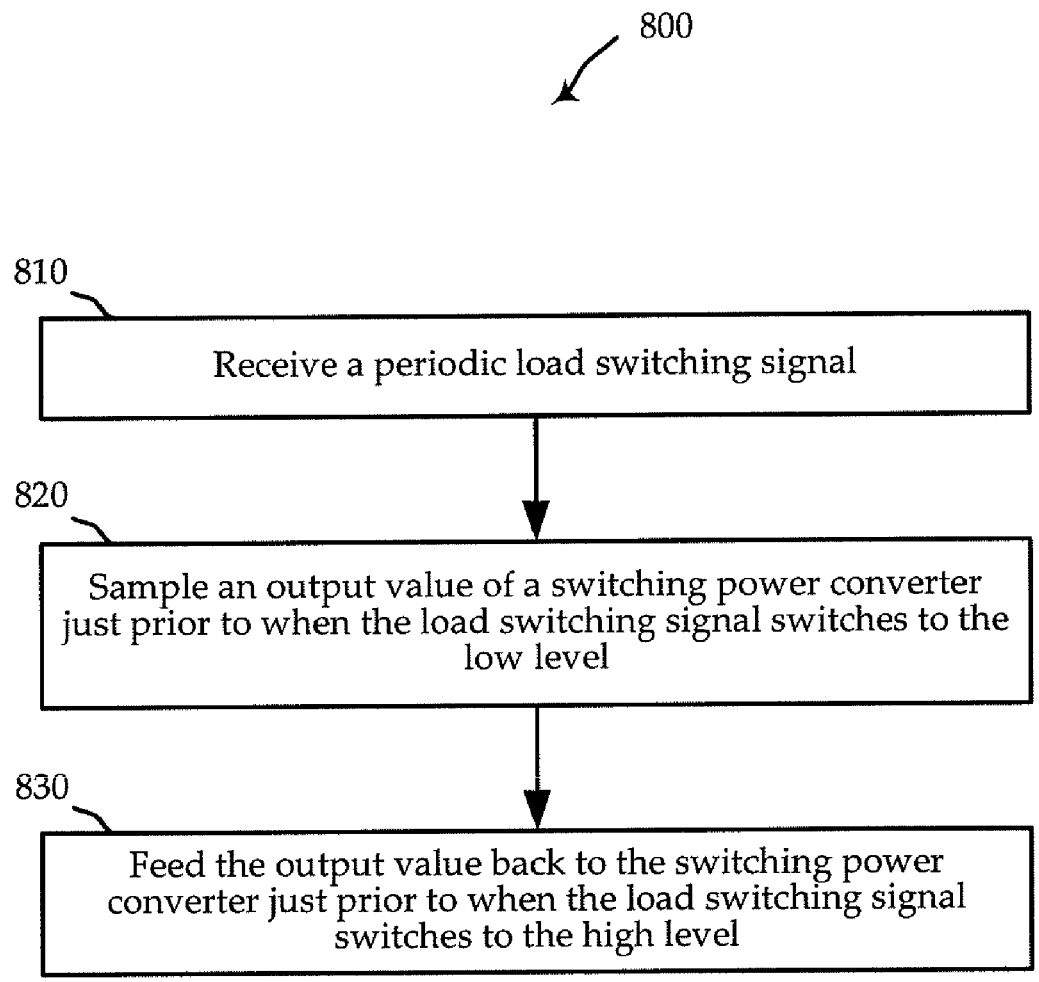
FIG. 8 shows a flow diagram of illustrative methods for handling switched load conditions using a switching power converter, according to various embodiments of the invention.

FIG. 8 shows a flow diagram of illustrative methods for handling switched load conditions using a switching power converter, according to various embodiments of the invention. The method 800 begins at block 810 by receiving a load switching signal. The load switching signal may periodically switch between a low level and a high level (e.g., a PWM signal). At block 820, an output value of the switching power converter is sampled just prior to when the load switching signal switches to the low level. The output value may be fed back at block 830 to the switching power converter just prior to when the load switching signal switches to the high level.

It should be noted that the methods, systems, and devices discussed above are intended merely to be examples. Specifically, any switching power converter having an inductor in series with the load may benefit from embodiments of the invention. Further, embodiments of the invention may be used in either continuous or discontinuous modes of controller operation.

It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

It should also be appreciated that the following systems, methods, and software may individually or collectively be components of a larger system, wherein other procedures may take precedence over or otherwise modify their application. Also, a number of steps may be required before, after, or concurrently with the following embodiments.

Specific details are given in the description to provide a thorough understanding of the embodiments. However, it will be understood by one of ordinary skill in the art that the embodiments may be practiced without these specific details. For example, well-known circuits, processes, algorithms, structures, waveforms, and techniques have been shown without unnecessary detail in order to avoid obscuring the embodiments.

Further, it may be assumed at various points throughout the description that all components are ideal (e.g., they create no delays and are lossless) to simplify the description of the key ideas of the invention. Those of skill in the art will appreciate that non-idealities may be handled through known engineering and design skills. It will be further understood by those of skill in the art that the embodiments may be practiced with substantial equivalents or other configurations.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Accordingly, the above description should not be taken as limiting the scope of the invention, as described in the following claims.

What is claimed is:

1. A circuit, comprising:
an output sensing module, configured to be communicatively coupled with a switching power converter, and operable to generate an output sense signal as a function of a load output, wherein:
the switching power converter includes a low-side switching module coupled with a bus voltage through a magnetic element and a load and configured to store energy in the magnetic element when the low-side switching module is in an on state, and is operable to receive a converter driver signal having a duty cycle and switch the bus voltage as a function of the converter driver signal to generate the load output as a function of the duty cycle; and
the output sense signal has a period, including:
a first portion of the period, during which the low-side switching module is in the on state and the output sense signal substantially correlates with the load output; and
a second portion of the period, during which the output sense signal substantially does not correlate with the load output; and
a sampling module, communicatively coupled with the output sensing module, and operable to sample the output sense signal during the first portion of the period to generate an output sense level that is functionally related to the load output.

2. The circuit of claim 1, wherein the sampling module comprises:
a switching unit, configured to operate in an open mode and a closed mode;
a switch driver unit, operable to control operation of the switching unit; and
a holding unit, operable to:
record a level of the output sense signal when the switching unit is operating in the closed mode; and
generate the output sense level by holding the level of the output sense signal when the switching unit is operating in the open mode.

3. The circuit of claim 2, wherein:
the switch driver unit is operable to control operation of the switching unit as a function of a sample driver signal, the sample driver signal being functionally related to the converter driver signal.

4. The circuit of claim 1, further comprising:
a feedback unit, operable to generate the converter driver signal as a function of the output sense level.

5. The circuit of claim 4, wherein:
the feedback unit comprises an oscillator unit configured to generate an oscillation signal at an oscillation frequency; and
the feedback unit is operable to generate the converter driver signal as a function of the oscillation signal.

6. The circuit of claim 5, wherein the feedback unit further comprises:
an error amplifier unit, operable to generate an error level as a function of the output sense level and a reference level; and
a comparator unit, communicatively coupled with the oscillator unit and the error amplifier unit, and operable to generate a feedback output signal as a function of comparing the error level against the oscillation signal, such that a duty cycle of the feedback output signal is a function of the error level,
wherein the converter driver signal is generated as a function of the feedback output signal, such that the duty cycle of the converter driver signal is substantially equal to the duty cycle of the feedback output signal.

7. The circuit of claim 6, wherein the sampling module comprises:
a sampler configured to be driven at a sampling frequency by a switch driver signal,
wherein the sample driver signal is generated as a function of the feedback output signal, such that the sampling frequency is a function of the oscillation frequency.

8. The circuit of claim 7, wherein:
the oscillator unit is operable to generate the oscillation frequency at an adjustable oscillation frequency; and the sample driver signal is generated as a function of the feedback output signal, such that the sampling frequency is adjustable as a function of the adjustable oscillation frequency.

9. The circuit of claim 1, wherein the sampling module further comprises an integration unit.

10. The circuit of claim 1, wherein the sampling module further comprises a delay unit, operable to delay sampling of the output sense signal to ensure sampling of the output sense signal during the first portion of the period.

11. The circuit of claim 10, wherein the delay unit is configured to provide an adjustable amount of delay.

12. The circuit of claim 1, wherein the sampling module further comprises a buffer unit configured to provide a level of output impedance for the sampling module.

13. The circuit of claim 1, wherein:
the load output is a load current; and
the output sensing module comprises a current sensing unit.

14. The circuit of claim 1, wherein:
the load output is a load current; and
the output sensing module is communicatively coupled with the low-side switching module, and operable to generate the output sense signal as a function of current through the low-side switching module.

15. The circuit of claim 14, wherein:
the current through the low-side switching module is characterized by a switch current waveform having
a spike portion that includes a current spike,
a correlative portion during which the current through the low-side switching module substantially correlates with the load output, and
an off portion during which the current through the low-side switching module is substantially zero; and
the first portion of the output sense signal corresponds temporally with the correlative portion of the switch current waveform.

16. The circuit of claim 1, further comprising the switching power converter.

17. A method comprising:
generating an output sense signal as a function of a load output, the load output being generated by a switching power converter that includes a low-side switching module coupled with a bus voltage through a magnetic element and a load and configured to store energy in the magnetic element when the low-side switching module is in an on state, the switching power converter being operable to receive a converter driver signal having a duty cycle and switch the bus voltage as a function of the converter driver signal to generate the load output as a function of the duty cycle, wherein the output sense signal has a period, including:
a first portion of the period, during which the low-side switching module is in the on state and the output sense signal substantially correlates with the load output; and
a second portion of the period, during which the output sense signal substantially does not correlate with the load output; and sampling the output sense signal only during the first portion of the period to generate an output sense level that is functionally related to the load output.

18. The method of claim 17, wherein sampling the output sense signal comprises:
generating a sample driver signal as a function of the converter driver signal, the sample driver signal having a period, each period having a sample portion and a hold portion; and
driving a sampling unit using the sample driver signal such that the sampling unit records a level of the output sense signal during the sample portion of at least one period and holds the level of the output sense signal during the hold portion of the at least one period, wherein the output sense level is the level of the output sense signal held during the hold portion of the at least one period.

19. The method of claim 17, further comprising:
generating the converter driver signal as a function of the output sense level.

20. The method of claim 19, wherein generating the converter driver signal as a function of the output sense level comprises:
generating an oscillation signal at an oscillation frequency; and
generating the converter driver signal as a function of comparing the oscillation signal against the output sense signal.

21. The method of claim 20, further comprising:
generating a sample driver signal as a function of the oscillation signal, the sample driver signal configured to be used for driving sampling of the output sense signal and having a sampling frequency that is functionally related to the oscillation frequency.

22. The method of claim 21, wherein:
the oscillation frequency is adjustable; and
the sample driver signal is generated as a function of the oscillation signal such that the sampling frequency is adjustable as a function of the adjustable oscillation frequency.

23. A system comprising:
means for generating an output sense signal as a function of a load output, the load output being generated by a switching power converter that includes a low-side switching module coupled with a bus voltage through a magnetic element and a load and configured to store energy in the magnetic element when the low-side switching module is in an on state, the switching power converter being operable to receive a converter driver signal having a duty cycle and switch the bus voltage as a function of the converter driver signal to generate the load output as a function of the duty cycle, wherein the output sense signal has a period, including:
a first portion of the period, during which the low-side switching module is in the on state and the output sense signal substantially correlates with the load output; and
a second portion of the period, during which the output sense signal substantially does not correlate with the load output; and means for sampling the output sense signal only during the first portion of the period to generate an output sense level that is functionally related to the load output.

24. The system of claim 23, wherein the means for sampling the output sense signal comprises:

means for generating a sample driver signal as a function of the converter driver signal, the sample driver signal having a period, each period having a sample portion and a hold portion; and means for sampling as a function of the sample driver signal by recording a level of the output sense signal during the sample portion of at least one period and holding the level of the output sense signal during the hold portion of the at least one period.

* * * * *